March 13, 1945.  H. HAMBRICK  2,371,441
FLEXIBLE MEASURING TAPE ATTACHMENT
Filed Oct. 21, 1943  2 Sheets-Sheet 2
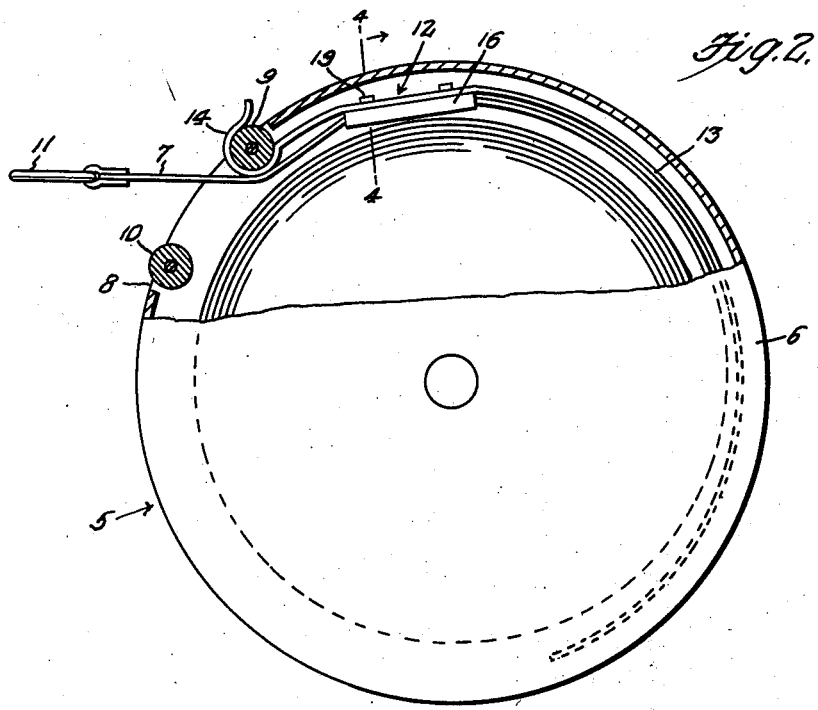
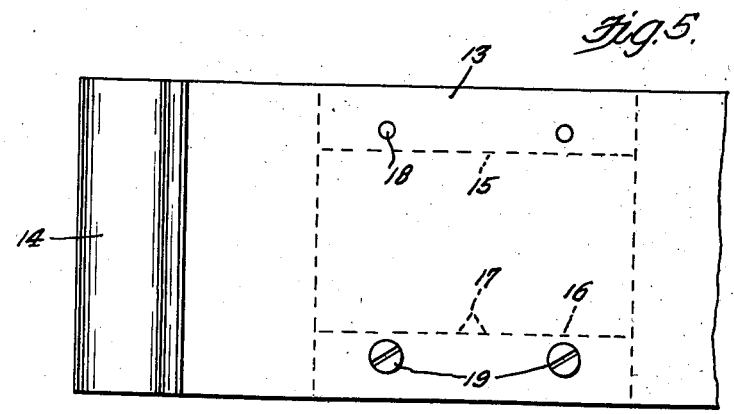
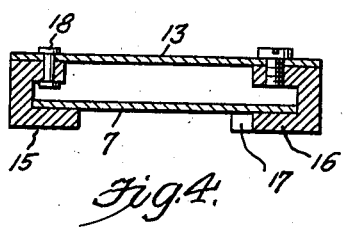
Inventor
HOOD HAMBRICK
By Clarence A. O'Brien
and Harvey B. Jacobson
Attorneys

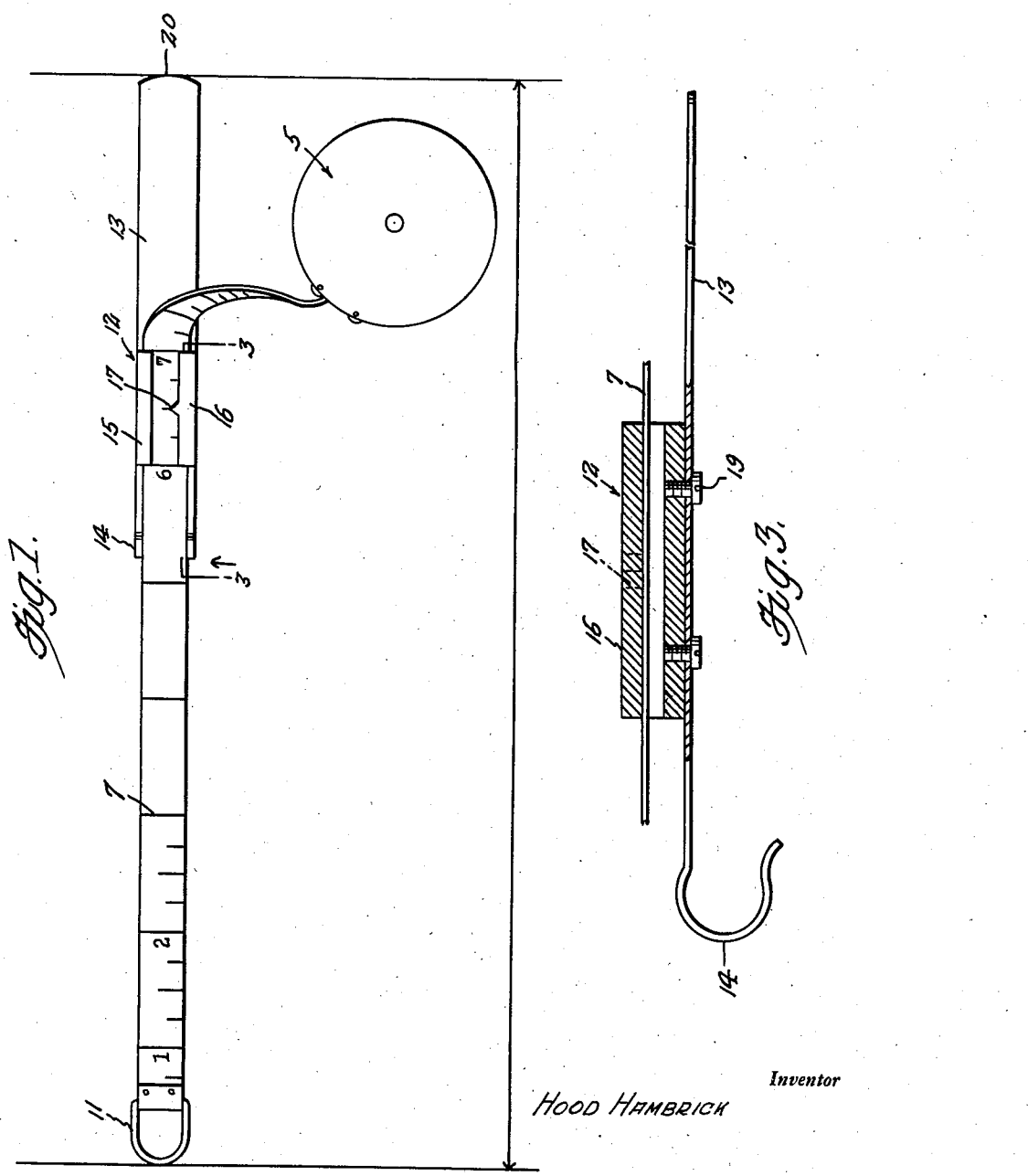

Patented Mar. 13, 1945

2,371,441

UNITED STATES PATENT OFFICE 2,371,441

FLEXIBLE MEASURING TAPE ATTACHMENT

Hood Hambrick, Houston, Tex.

Application October 21, 1943, Serial No. 507,145

4 Claims. (Cl. 33—138)

This invention relates to new and useful improvements in flexible measuring tapes, and more particularly to an attachments therefor, the principal object being to provide an extension for flexible measuring tapes, whereby the internal measurements of various structures can be readily and accurately ascertained.

Another object of the invention is to provide a flexible measuring tape extension device which is permanently associated with the usual flexible tape and reel therefor, but which can be used either along with the tape or left attached to the usual reel.

Other objects and advantages of the invention will become apparent to the reader of the following description.

In the drawings:

Figure 1 is an elevational view showing the extension attachment associated with a measuring tape.

Figure 2 is a fragmentary vertical sectional view through a tape reel showing the extension attachment in reel attached position.

Figure 3 is an enlarged fragmentary detailed sectional view taken on the line 3—3 of Figure 1.

Figure 4 is a transverse sectional view taken on the line 4—4 of Figure 2.

Figure 5 is a fragmentary top plan view of the attachment.

Referring to the drawings wherein like numerals designate like parts, the numeral 5 generally refers to a flexible measuring tape reel, the same consisting of a case 6 having a rotor therein upon which a flexible steel measuring tape 7 is wound. This type of reel has an opening 8 through which the tape can move and at the upper and lower portions of this opening 8 are guide rollers 9, 10, against which the tape 7 can ride. The outer end of the tape 7 has an eye 11 which forms part of the first inch measurement of the tape.

Numeral 12 generally refers to the present invention which may be regarded as an attachment. Further, the present invention serves as an extension, to the end that the tape can be used in a capacity of measuring internal diameters and other measurements, as depicted in Figure 1.

The attachment 12 consists of an elongated, flexible metal strip 13 (this strip may be of plastic or some other material) having one end bent backwardly, as at 14, to form a snap hook capable of snapping over the upper roller 9 in the manner shown in Figure 2.

A pair of channeled members 15, 16, the latter having a pointer 17 projecting inwardly, is secured to the flexible strip 13, the first by rivets 18 and the latter by screws 19, to the end that the channeled guide member 16 can be removed when it is desired to insert or remove the tape 7.

The extension attachment 12 is of a predetermined length (say 6 inches) from the pointer 17 to the contact end 20 thereof, the result being that when the extension device is used in the capacity shown in Figure 1, the distance from the contact end 20 to the pointer 17 is added to the distance between the marker point on the tape and the extremity of the eye 11.

The attachment is flexible and fits into the case 6, as shown in Figure 2, with the snap hook 14 engaging the upper roller 9, and unless the snap hook 14 is pulled loose from the roller 9, the measuring tape 7 can be paid out and wound without interference from the attachment 12.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An attachment for measuring tapes and the reels thereof, wherein the reel embodies a casing having a guide roller over which the tape passes as it is withdrawn from the casing; an elongated measuring device adapted to be coiled within the casing and having a guide thereon through which the tape is disposed, and a spring attaching member at one end of the elongated member for engaging the roller when the measuring device is coiled in the casing and preventing displacement of the measuring device so that the measuring tape can be pulled through the guide means thereof, said guide means consisting of a pair of channeled members on the elongated member, one of which is removable from the elongated member.

2. An attachment for measuring tapes and the reels thereof, wherein the reel embodies a casing having a guide roller over which the tape passes as it is withdrawn from the casing; an elongated measuring device adapted to be coiled within the casing and having a guide thereon through which the tape is disposed, and a spring attaching member at one end of the elongated member for engaging the roller when the measuring device is coiled in the casing and preventing displacement of the measuring device so that the measuring tape can be pulled through the guide means thereof, said guide means consisting of a pair of channeled members on the elongated member, one of which is removable from the elongated member, one of said channeled members being provided with an inwardly projecting pointer.

3. An extension attachment for a measuring tape and reel therefor, wherein the reel includes a rotor upon which the tape is wound and a case for the rotor having an opening through which the tape moves and a guide roller for the tape mounted in said opening, said attachment comprising an elongated flexible strip of predetermined length slidable in said opening and adapted to be stowed in the case between the peripheral wall of the latter and the tape, and channel guides secured to opposite sides of said strip adjacent but rearwardly of its outer end for holding said outer end adjacent the tape, said tape being freely movable through the guides, and a resilient hook on the outer end of said strip releasably engageable with the guide roller to permit the tape to be withdrawn from or wound in the case and to simultaneously maintain the strip stowed in the case.

4. An extension attachment for a measuring tape and reel therefor, wherein the reel includes a rotor upon which the tape is wound and a case for the rotor having an opening through which the tape moves and a guide roller for the tape mounted in said opening, said attachment comprising an elongated flexible strip of predetermined length slidable in said opening and adapted to be stowed in the case between the peripheral wall of the latter and the tape, and channel guides secured to opposite sides of said strip adjacent but rearwardly of its outer end for holding said outer end adjacent the tape, said tape being freely movable through the guides, and a resilient hook on the outer end of said strip releasably engageable with the guide roller to permit the tape to be withdrawn from or wound in the case and to simultaneously maintain the strip stowed in the case, one of said guides being readily detachable from the strip to facilitate application or removal of the attachment relative to the tape.

HOOD HAMBRICK.